(12) United States Patent
Moshchuk et al.

(10) Patent No.: US 7,788,007 B2
(45) Date of Patent: *Aug. 31, 2010

(54) ROLL STABILITY INDICATOR FOR VEHICLE ROLLOVER CONTROL

(75) Inventors: Nikolai K. Moshchuk, Grosse Pointe, MI (US); Shih-Ken Chen, Troy, MI (US); Cheng-Foo Chen, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1268 days.

This patent is subject to a terminal disclaimer.

(21) Appl. No.: 11/330,640

(22) Filed: Jan. 12, 2006

(65) Prior Publication Data

US 2007/0162202 A1 Jul. 12, 2007

(51) Int. Cl.
*B60G 17/16* (2006.01)
(52) U.S. Cl. .................... 701/38; 701/41; 280/735; 340/440; 180/271; 180/282
(58) Field of Classification Search ............. 701/38, 701/69, 41; 180/197, 199, 271, 282; 280/5.5, 280/735; 104/284; 340/440
See application file for complete search history.

(56) References Cited

U.S. PATENT DOCUMENTS

| | | | |
|---|---|---|---|
| 5,446,658 A | | 8/1995 | Pastor et al. |
| 5,475,593 A | * | 12/1995 | Townend ................. 701/38 |
| 6,002,975 A | * | 12/1999 | Schiffmann et al. ........... 701/36 |
| 6,192,305 B1 | * | 2/2001 | Schiffmann ............ 701/45 |
| 6,332,104 B1 | * | 12/2001 | Brown et al. ............ 701/1 |
| 6,338,012 B2 | * | 1/2002 | Brown et al. ............ 701/1 |
| 6,529,803 B2 | * | 3/2003 | Meyers et al. ............ 701/1 |

(Continued)

FOREIGN PATENT DOCUMENTS

EP 1110835 A2 * 6/2001

(Continued)

OTHER PUBLICATIONS

Robust Model-Based Fault Detection for a Roll Stability Control System; Li Xu; Tseng, H.E.; Control Systems Technology, IEEE Transactions on; vol. 15, Issue 3, May 2007 pp. 519-528; Digital Object Identifier 10.1109/TCST.2006.890287.*

(Continued)

*Primary Examiner*—Cuong Nguyen
(74) *Attorney, Agent, or Firm*—John A. Miller; Miller IP Group, PLC

(57) ABSTRACT

A system and method for providing a vehicle roll stability indicator that estimates the propensity for vehicle rollover. The system determines vehicle kinematics from vehicle sensors, such as roll rate, yaw rate, lateral acceleration, vehicle speed, etc. From these kinematic values, the system estimates a roll angle of the vehicle and a bank angle of the vehicle. From the estimated bank angle, the system provides a corrected roll angle. From the corrected roll angle, the system determines a roll energy of the vehicle and a roll energy rate of the vehicle. From the roll energy and the roll energy rate, the system calculates a roll stability indicator that defines the potential that the vehicle will tip-up or roll over. From the roll stability indicator, vehicle stability control systems can take suitable action.

28 Claims, 3 Drawing Sheets

U.S. PATENT DOCUMENTS

| | | | |
|---|---|---|---|
| 6,600,414 | B2 | 7/2003 | Foo et al. |
| 6,732,034 | B2 | 5/2004 | Hambsch et al. |
| 6,804,584 | B2* | 10/2004 | Tseng et al. .................. 701/1 |
| 6,856,868 | B1* | 2/2005 | Le et al. ....................... 701/38 |
| 7,571,039 | B2* | 8/2009 | Chen et al. .................... 701/38 |
| 7,647,148 | B2* | 1/2010 | Lu ................................. 701/38 |
| 7,672,765 | B2* | 3/2010 | Moshchuk et al. ............ 701/38 |
| 2005/0131604 | A1* | 6/2005 | Lu ................................. 701/38 |
| 2005/0256620 | A1* | 11/2005 | Kato et al. ..................... 701/41 |
| 2006/0265108 | A1* | 11/2006 | Kieren et al. ................... 701/1 |
| 2007/0162204 | A1* | 7/2007 | Moshchuk et al. ............ 701/38 |
| 2007/0182204 | A1* | 8/2007 | Curtis et al. ........... 296/146.11 |
| 2008/0040000 | A1* | 2/2008 | Chen et al. .................... 701/38 |
| 2009/0152940 | A1* | 6/2009 | Mercier et al. ........... 303/113.2 |
| 2009/0224493 | A1* | 9/2009 | Buma et al. .............. 280/5.511 |

FOREIGN PATENT DOCUMENTS

| | | | | |
|---|---|---|---|---|
| JP | 2001219840 | A | * | 8/2001 |
| JP | 2005-175989 | | * | 6/2005 |
| JP | PCT/JP2006/312213 | | * | 12/2007 |

OTHER PUBLICATIONS

Development and Experimental Evaluation of a Slip Angle Estimator for Vehicle Stability Control; Piyabongkarn, D.; Rajamani, R.; Grogg, J.A.; Lew, J.Y.; Control Systems Technology, IEEE Transactions on; vol. 17, Issue 1, Jan. 2009 pp. 78-88 Digital Object Identifier 10.1109/TCST.2008.922503.*

Robust observer for prevention of vehicle rollover; Rabhi, A.; Chadli, M.; El Hajjaji, A.; Bosche, J.; Advances in Computational Tools for Engineering Applications, 2009. ACTEA '09. International Conference on; Jul. 15-17, 2009 pp. 627-632 Digital Object Identifier 10.1109/ACTEA.2009.5227837.*

Robust Model-Based Fault Detection for a Roll Stability Control System; Li Xu; Tseng, H.E.; Control Systems Technology, IEEE Transactions on; vol. 15, Issue: 3; Digital Object Identifier: 10.1109/TCST.2006.890287; Publication Year: 2007, pp. 519-528.*

Robust observer for prevention of vehicle rollover; Rabhi, A.; Chadli, M. et al.; Advances in Computational Tools for Engineering Applications, 2009. ACTEA '09. International Conference on; Digital Object Identifier: 10.1109/ACTEA.2009.5227837; Publication Year: 2009, pp. 627-632.*

Vehicle dynamics control and controller allocation for rollover prevention; Schofield, B. et al.; Computer Aided Control System Design, 2006 IEEE International Conference on Control Applications, 2006 IEEE International Symposium on Intelligent Control, 2006 IEEE; Digital Object Identifier: 10.1109/CACSD-CCA-ISIC.2006.4776639.*

Simulation study of oscillatory vehicle roll behavior during fishhook Maneuvers; Moshchuk, N. et al..; American Control Conference, 2008; Digital Object Identifier: 10.1109/ACC.2008.4587107; Publication Year: 2008, pp. 3933-3940.*

Investigation of ION and a Heavy Truck on Rollover Propensity and Prevention; Yongjie Zhu; Ozguner, I.; American Control Conference, 2007. ACC '07; Jul. 9-13, 2007 pp. 1630-1635; Digital Object Identifier 10.1109/ACC.2007.4283126.*

Vehicle State Estimation for Roll Control System; Jihan Ryu; Moshchuk, N.K.; Shih-Ken Chen; American Control Conference, 2007. ACC '07; Jul. 9-13, 2007 pp. 1618-1623; Digital Object Identifier 10.1109/ACC.2007.4282456.*

Design of a Novel Fuzzy Controller to Enhance Stability of Vehicles; Biglarbegian, M.; Melek, W.; Golnaraghi, F.; North American Fuzzy Information Processing Society, 2007. NAFIPS '07. Annual Meeting of the, Jun. 24-27, 2007 pp. 410-414 Digital Object Identifier 10.1109/NAFIPS.2007.383874.*

Research on Rollover Early Warning Algorithm for Heavy Tractor-Semitrailer Based on PTR Metric; Zhu Tianjun; Zong Changfu; Intelligent Systems and Applications, 2009. ISA 2009. International Workshop on; May 23-24, 2009 pp. 1-4 Digital Object Identifier 10.1109/IWISA.2009.5073081.*

Hac, Aleksander et al., "Detection of Vehicle Rollover", SAE Technical Paper Series, 2004-01-1757, Reprinted from Vehicle Dynamics & Simulation (2004), SAE International World Congress, Detroit, MI, Mar. 8-11, 2004.

* cited by examiner

ROLL STABILITY INDICATOR FOR VEHICLE ROLLOVER CONTROL

BACKGROUND OF THE INVENTION

1. Field of the Invention

This invention relates generally to a system and method for providing a vehicle roll stability indicator that is indicative of the potential for vehicle roll and, more particularly, to a system and method for providing a vehicle roll stability indicator that is indicative of the potential for vehicle roll, where determining the roll stability indicator includes calculating vehicle roll energy and roll energy rate.

2. Discussion of the Related Art

It is known in the art to provide vehicle rollover control using differential braking control, rear-wheel steering control, front-wheel steering control, or any combination thereof to prevent a vehicle from rolling over. A vehicle roll prevention system may receive vehicle dynamics information from various sensors, such as yaw rate sensors, lateral acceleration sensors and roll rate sensors, to determine the proper amount of control action to be taken to prevent vehicle roll over. A balance typically needs to be provided between controlling the vehicle roll motion and the vehicle yaw motion to provide the optimal vehicle response. Thus, it is usually necessary to detect certain vehicle conditions to provide the roll prevention control.

Various methodologies are known in the art to detect these vehicle conditions. Specifically, rollover determination can be based on vehicle roll rate from a roll rate sensor and roll angle estimation. For prior techniques, thresholds for roll rate and roll angle are established to detect an imminent rollover. Even though roll rate and roll angle are the two most important elements for detecting vehicle roll motion, they do not reflect the total vehicle roll energy that would eventually determine the vehicles propensity to roll over.

SUMMARY OF THE INVENTION

In accordance with the teachings of the present invention, a system and method are disclosed for providing a vehicle roll stability indicator that estimates the propensity for vehicle rollover. The system determines vehicle kinematics from various vehicle sensors, such as roll rate, yaw rate, lateral acceleration, vehicle speed, etc. From these kinematic values, the system estimates a roll angle of the vehicle and a bank angle of the vehicle. The estimated bank angle is used to correct the roll angle. The system determines a roll energy of the vehicle and a roll energy rate of the vehicle from the corrected roll angle. From the roll energy and the roll energy rate, the system calculates a roll stability indicator that defines the potential that the vehicle wheels will lift off of the ground or the vehicle will roll over. From the roll stability indicator, vehicle stability control systems can take suitable action.

Additional features of the present invention will become apparent from the following description and appended claims taken in conjunction with the accompanying drawings.

DETAILED DESCRIPTION OF THE EMBODIMENTS

The following discussion of the embodiments of the invention directed to a process for determining a vehicles rollover probability by determining the vehicles roll energy and roll energy rate is merely exemplary in nature, and is in no way intended to limit the invention or its applications or uses.

As will be discussed below, the present invention includes a system and method for determining the probability that a vehicle wheels will lift off of the ground (tip-up) or the vehicle will roll over by determining a roll stability indicator as a function of roll angle and roll rate to give the roll energy. Vehicle rollover involves a complex interaction of forces acting on the vehicle that are influenced by vehicle maneuvering and road conditions. The vehicle roll motion is primarily caused by inertial forces, and in the case of high slip angle, by the tire overturning moment.

Figure 1:
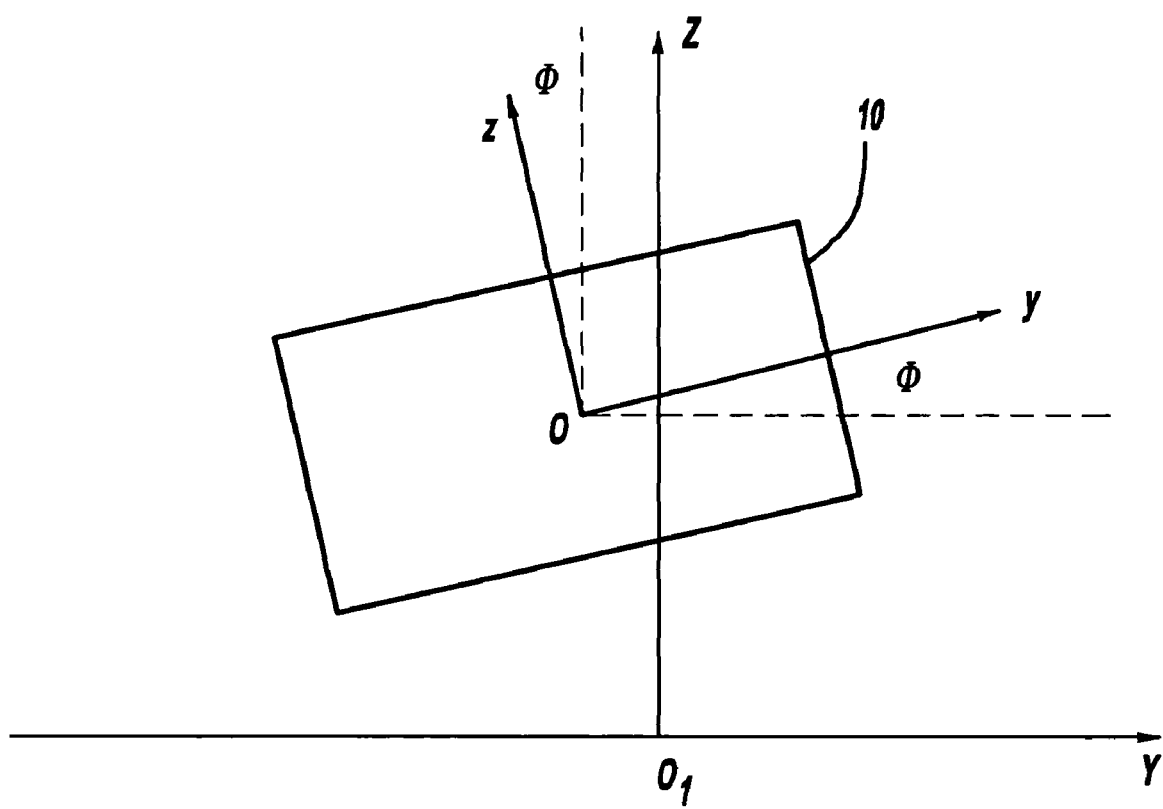
FIG. 1 is a schematic diagram of a vehicle under a roll motion.

FIG. 1 is a schematic diagram of a vehicle 10 in a rollover condition relative to a $O_1XYZ$ reference frame, where X is the forward direction relative to the vehicle 10, Z is the vertical direction relative to the vehicle 10 and Y is the lateral direction relative to the vehicle 10. It is assumed that the vehicle 10 is moving on a horizontal plane, and a vertical degree of freedom and the effect of tire overturning moment is neglected. A sprung mass fixed reference frame Oxyz of the vehicle 10 is shown in the roll position.

Under a steady-state condition during the roll, the center of gravity (CG) of the sprung mass of the vehicle 10 moves laterally and vertically and follows the trajectory:

$$Y = Y(\phi) \tag{1}$$

$$Z = Z(\phi) \tag{2}$$

Where $\phi$ is the vehicle roll angle.

The kinetic energy T and the potential energy $\Pi(\phi)$ of the vehicle sprung mass are given as:

$$T = \frac{1}{2}I_o\dot{\phi}^2 + \frac{1}{2}M(Y'^2 + Z'^2)\dot{\phi}^2 \tag{3}$$

$$\Pi(\varphi) = \Pi_{susp}(\varphi) + MgZ(\varphi) \tag{4}$$

Where $I_o$ is the roll moment of inertia of the sprung mass of the vehicle about the center of gravity, M is the mass of the vehicle, prime denotes differentiating with respect to the roll angle $\phi$, and $\Pi_{susp}(\phi)$ is the suspension potential energy during the roll motion.

In the linear region, $\Pi_{susp}(\phi) = K\phi^2$, where K is the roll stiffness. However, in the complete region, this is a non-linear function due to suspension ride and roll rate non-linearities.

If the mass of the vehicle 10 is rotated about a roll center, then:

$$M(Y'^2 + Z'^2) = MH^2 \tag{5}$$

Where H is the vehicle sprung mass center of gravity height above the roll axis.

By letting $(a_Y, a_Z)$ and $(a_y, a_z)$ be the components of the vector of acceleration in the frames $O_1XYZ$ and Oxyz, respectively, then:

$$a_Y = a_y \cos\phi - a_z \sin\phi \tag{6}$$

$$a_Z = a_y \sin\phi + a_z \cos\phi \tag{7}$$

The measured lateral accelerations $a_{ym} = a_y + g\sin\phi$ and $a_{zm} = a_z + g\sin\phi$ include the effect of gravity. The expression for the generalized force is:

$$Q = -M(a_Y Y' + a_Z Z') - I_{xz}\dot{r} \tag{8}$$

Where $I_{xz}$ is the yaw-roll product of inertia and r is the yaw rate.

Equation (8) can be defined in the form:

$$Q = -M[a_{ym}(Y'\cos\phi + Z'\sin\phi) + a_{zm}(-Y'\sin\phi + Z'\cos\phi) - gZ'] - I_{xz}\dot{r} \tag{9}$$

Lagrange's equation of motion is given as:

$$I_1\ddot{\varphi} + \frac{1}{2}I_1'\dot{\varphi}^2 = -\Pi'_{susp} - c\dot{\varphi} - M[a_{ym}(Y'\cos\varphi + Z'\sin\varphi) + a_{zm}(-Y'\sin\varphi + Z'\cos\varphi)] \tag{10}$$

Where $I_1 = I_0 + M(Y'^2 + Z'^2)$.

Equation (10) is valid for different phases of roll motion, including prior to wheel lift, one wheel lifted, two wheels lifted, etc. Note that the behavior of the functions Y, Z, c, Π is different for these phases.

The energy of the vehicle system can then be defined as:

$$E = T + \Pi = \frac{1}{2}I_1(\varphi)\dot{\varphi}^2 + \Pi_{susp}(\varphi) + MgZ(\varphi) \tag{11}$$

The change of energy (roll rate) during the roll motion is the derivative of the roll energy E:

$$\dot{E} = \dot{\varphi}Q \tag{12}$$

From equations (11) and (12), a roll stability indicator, according to the invention, can be calculated as:

$$RI = c_1 \frac{E}{E_{2WL}} + c_2 \frac{\dot{E}}{\dot{E}_{critical}} \tag{13}$$

Were $E_{2WL}$ is the predetermined amount of energy needed to lift two vehicle wheels, $\dot{E}_{critical}$ is the predetermined critical amount of energy rate where the vehicle will roll over and $c_1$ and $c_2$ are speed-dependent constants. Both the energy $E_{2WL}$ and the critical energy rate $\dot{E}_{critical}$ can be determined experimentally by vehicle testing. For a typical SUV, $E_{2WL} = 1000$ Nm and $\dot{E}_{critical} = 12500$ Nm/sec. Table 1 below is an exemplary look-up table that can be used to provide the two speed-dependent constants $c_1$ and $c_2$ for different vehicle speeds based on simulations.

TABLE 1

| | Speed (kph) | | | | |
|---|---|---|---|---|---|
| | 0 | 30 | 60 | 90 | 120 |
| $c_1$ | 0.8 | 0.9 | 1.0 | 1.1 | 1.2 |
| $c_2$ | 0.9 | 0.95 | 1.0 | 1.05 | 1.1 |

Figure 2:
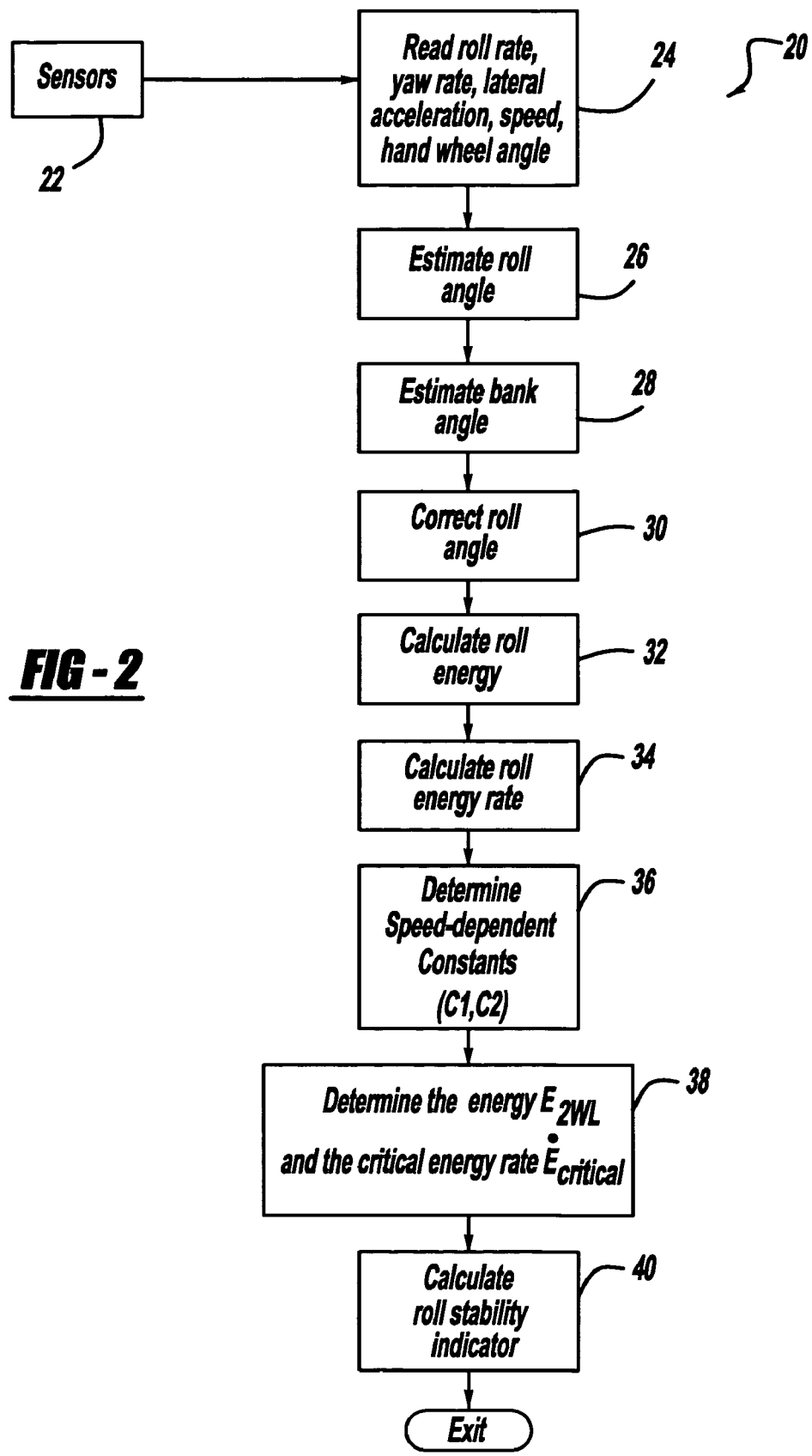
FIG. 2 is a flow chart diagram showing a process for estimating the roll energy of the vehicle and generating a roll stability indicator therefrom, according to an embodiment of the present invention.

FIG. 2 is a flow chart diagram 20 showing a method for determining the vehicle rollover energy E from equation (11), the energy roll rate $\dot{E}$ from equation (12) and the roll stability indicator from equation (13), according to one embodiment of the invention. The algorithm reads a plurality of sensor measurements, such as the vehicle roll rate, the vehicle yaw rate, the vehicle lateral acceleration, the vehicle speed and/or the hand-wheel angle from appropriate sensors 22 at box 24. The sensors 22 that provide this information can be any suitable sensor for this purpose, many of which are known, as will be well understood by those skilled in the art. The algorithm then estimates the roll angle φ at box 26 and estimates the vehicle bank angle θ at box 28. Various formulas are known in the art to estimate a vehicle roll angle and a vehicle bank angle using one or more of the sensor measurements referred to above. In one embodiment, a GPS system can be used to determine the estimate of the roll angle φ and the bank angle θ. One suitable example can be found in U.S. Pat. No. 5,446,658, titled Method and Apparatus for Estimating Incline and Bank Angles of a Road Surface, for this purpose. From the estimated roll angle φ and the estimated bank angle θ, the algorithm corrects the roll angle φ at box 30. From the corrected roll angle φ, the algorithm calculates the roll energy E from equation (11) at box 32 and the roll energy rate $\dot{E}$ from equation (12) at box 34.

The algorithm then determines the speed-dependant constants $c_1$ and $c_2$ at box 36 based on the vehicle speed from a desirable look-up table, such as Table 1. The algorithm then determines the energy $E_{2WL}$ and the critical energy rate $\dot{E}_{critical}$ at box 38 for the particular vehicle. The algorithm then calculates the roll stability indicator RI at box 40 using equation (13).

Figure 3:
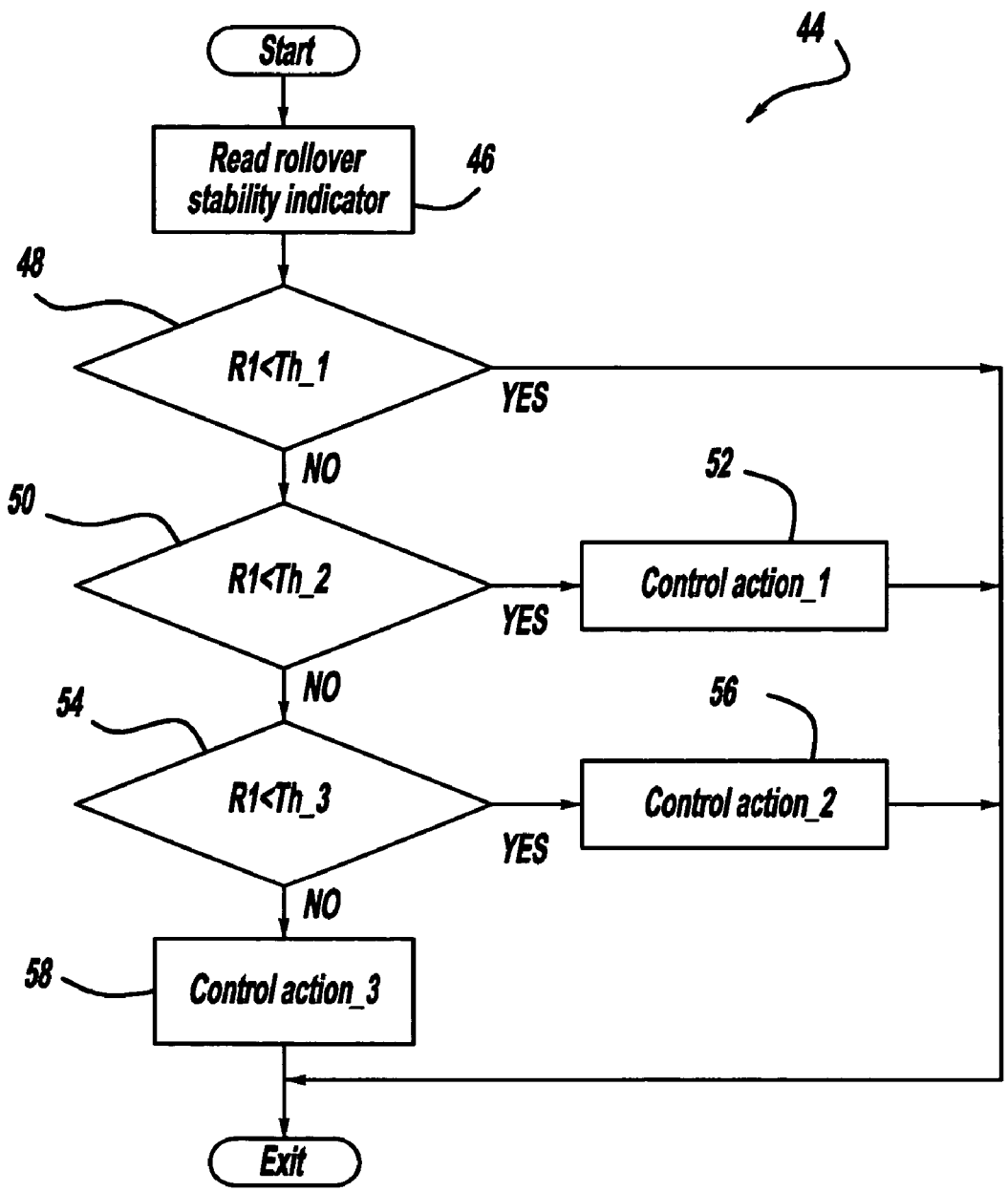
FIG. 3 is a flow chart diagram showing a process for using the roll stability indicator to provide vehicle tip-up and roll over prevention control.

FIG. 3 is a flow chart diagram 44 showing a general overview of an algorithm for a rollover prevention control system that uses the roll stability indicator RI calculated above to take appropriate action to prevent vehicle rollover. The algorithm first reads the roll stability indicator RI at box 46, and then determines whether the roll stability indicator RI is less than a first threshold Th_1 at decision diamond 48. In one embodiment, the threshold value Th_1 provides a first threshold indicating when the vehicle wheels start lifting off the ground for a particular vehicle. If the roll stability indicator RI is less than the first threshold Th_1 at the decision diamond 48, then the vehicle is not in danger of its wheels lifting off of the ground, and the algorithm exits the algorithm.

If the roll stability indicator RI is greater than the first threshold Th_1 at the decision diamond 52, then the algorithm determines whether the roll stability indicator RI is less than a second threshold value Th_2 at decision diamond 50. In one embodiment, the threshold value Th_2 represents the threshold beyond which two vehicle wheels on the same side lift off the ground more than 54 mm. If the roll stability indicator RI is greater than the first threshold value Th_1, but less than the second threshold value Th_2, then the stability control system takes a first lesser control action at box 52. This first action could include differential braking for one wheel, adjusting the steering wheel angle or stiffening the suspension.

If the roll stability indicator RI is greater than the second threshold value at the decision diamond 52, then the algorithm determines whether the roll stability indicator RI is less than a third threshold value Th_3 at decision diamond 54. If the roll stability indicator RI is greater than the second threshold value Th_2, but less than the third threshold value Th_3, then the stability control takes a second control action at box 56. The second control action can increase the intensity of the control action over the first control action, and possibly provide coordinated control at different control systems.

If the roll stability indicator is greater than the third threshold value Th_3 at the decision diamond 54, then the control algorithm takes a third control action at box 58. The third control action can include emergency braking to slow down the vehicle quickly.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for generating a roll stability indicator for indicating a likelihood that a vehicle will tip-up or rollover, said method comprising:
   providing a roll rate signal of the roll rate of the vehicle;
   providing a yaw rate signal of the yaw rate of the vehicle;
   providing a lateral acceleration signal of the lateral acceleration of the vehicle;
   providing a speed signal of the speed of the vehicle;
   providing a hand-wheel angle signal of the angle of the hand-wheel of the vehicle;
   estimating a roll angle signal of the vehicle based on one or more of the roll rate signal, the yaw rate signal, the lateral acceleration signal, the speed signal and the hand-wheel angle signal;
   estimating a bank angle signal of the vehicle from one or more of the roll rate signal, the yaw rate signal, the lateral acceleration signal, the vehicle speed signal and the hand-wheel angle signal;
   correcting the roll angle signal based on the estimated bank angle signal to provide a corrected roll angle signal;
   calculating a roll energy signal based on the corrected roll angle signal;
   calculating a roll energy rate signal based on the roll energy signal;
   determining a critical energy signal and a critical energy rate signal; and
   calculating the roll stability indicator based on the roll energy signal, the roll energy rate signal, the critical energy signal and the critical energy rate signal.

2. The method according to claim 1 wherein calculating the roll stability indicator also includes using speed-dependant constants.

3. The method according to claim 2 wherein the speed-dependent constants are provided in a look-up table for different vehicle speeds.

4. The method according to claim 2 wherein calculating the roll stability indicator includes using the equation:

$$RI = c_1 \frac{E}{E_{2WL}} + c_2 \frac{\dot{E}}{\dot{E}_{critical}}$$

where RI is the roll stability indicator, $c_1$ and $c_2$ are the speed-dependant constants, $E_{2WL}$ is the critical energy signal, $\dot{E}_{critical}$ is the critical energy rate signal, E is the roll energy signal and $\dot{E}$ is the roll energy rate signal.

5. The method according to claim 1 wherein calculating the roll energy signal includes using the equation:

$$E = T + \Pi = \frac{1}{2} I_1(\varphi)\dot{\varphi}^2 + \Pi_{susp}(\varphi) + MgZ(\varphi)$$

where E is the roll energy signal, T is the kinetic energy of the vehicle, $\Pi$ is the potential energy of the vehicle, $I_1$ is the roll moment of inertia, M is the mass of the vehicle, $\varphi$ is the roll angle, $\Pi_{susp}$ is the potential energy of a suspension of the vehicle during the roll motion, g is the gravitational constant and Z is the movement of the vehicle center of gravity in a vertical direction.

6. The method according to claim 1 wherein calculating the roll energy rate signal includes using the equation:

$$\dot{E} = \dot{\varphi} Q$$

where $\dot{E}$ is the roll energy rate signal, $\dot{\varphi}$ is the derivative of the roll angle signal and Q is a generalized force on the vehicle.

7. The method according to claim 1 wherein determining the critical energy signal and the critical energy rate signal includes determining the critical energy signal and the critical energy rate signal experimentally by vehicle testing.

8. The method according to claim 1 wherein estimating a roll angle signal and estimating a bank angle signal includes using a GPS signal.

9. A method for generating a roll stability indicator for indicating a likelihood that a vehicle will tip-up or roll over, said method comprising:
   providing vehicle kinematics signals;
   estimating a roll angle signal of the vehicle from the vehicle kinematics signals;
   calculating a roll energy signal based on the estimated roll angle signal;
   calculating a roll energy rate signal based on the roll energy signal; and
   calculating the roll stability indicator using the roll energy signal and the roll energy rate signal.

10. The method according to claim 9 further comprising determining a critical energy signal and a critical energy rate signal, wherein calculating the roll stability indicator includes also using the critical energy signal and the critical energy rate signal.

11. The method according to claim 10 wherein determining the critical energy signal and the critical energy rate signal includes determining the critical energy signal and the critical energy rate signal experimentally by vehicle testing.

12. The method according to claim 10 wherein calculating the roll stability indicator also includes using speed-dependent constants.

13. The method according to claim 12 wherein the speed-dependent constants are provided in a look-up table for different vehicle speeds.

14. The method according to claim 12 wherein calculating the roll stability indicator includes using the equation:

$$RI = c_1 \frac{E}{E_{2WL}} + c_2 \frac{\dot{E}}{\dot{E}_{critical}}$$

where RI is the roll stability indicator, $c_1$ and $c_2$ are the speed-dependant constants, $E_{2WL}$ is the critical energy signal, $\dot{E}_{critical}$ is the critical energy rate signal, E is the roll energy signal and $\dot{E}$ is the roll energy rate signal.

15. The method according to claim 9 wherein calculating the roll energy signal includes using the equation:

$$E = T + \Pi = \frac{1}{2}I_1(\varphi)\dot{\varphi}^2 + \Pi_{susp}(\varphi) + MgZ(\varphi)$$

where E is the roll energy signal, T is the kinetic energy of the vehicle, Π is the potential energy of the vehicle, $I_1$ is the roll moment of inertia, M is the mass of the vehicle, ϕ is the roll angle, $\Pi_{susp}$ is the potential energy of a suspension of the vehicle during the roll motion, g is the gravitational constant and Z is the movement of the vehicle center of gravity in a vertical direction.

16. The method according to claim 9 wherein calculating the roll energy rate signal includes using the equation:

$$\dot{E} = \dot{\varphi}Q$$

where $\dot{E}$ is the roll energy rate signal, $\dot{\varphi}$ is the derivative of the roll angle signal and Q is a generalized force on the vehicle.

17. The method according to claim 9 wherein estimating the roll angle signal includes using a GPS signal.

18. The method according to claim 9 wherein providing vehicle kinematics signals includes providing vehicle kinematic signals from one or more of a roll rate sensor, a yaw rate sensor, a lateral acceleration sensor, a vehicle speed sensor and a vehicle hand-wheel angle sensor.

19. A system for generating a roll stability indicator that indicates a likelihood that a vehicle will tip-up or roll over, said system including a plurality of vehicle sensors for providing vehicle kinematics information and computer-executable instructions for:
    estimating a roll angle signal of the vehicle from the vehicle kinematics information;
    calculating a roll energy signal based on the estimated roll angle signal;
    calculating a roll energy rate signal based on the roll energy signal; and
    calculating the roll stability indicator using the roll energy signal and the roll energy rate signal.

20. The system according to claim 19 further comprising determining a critical energy signal and a critical energy rate signal, wherein calculating the roll stability indicator uses the critical energy signal and the critical energy rate signal.

21. The system according to claim 20 wherein determining the critical energy signal and the critical energy rate signal includes determining the critical energy signal and the critical energy rate signal experimentally by vehicle testing.

22. The system according to claim 20 wherein calculating the roll stability indicator uses speed-dependent constants.

23. The system according to claim 22 wherein the speed-dependent constants are provided in a look-up table for different vehicle speeds.

24. The system according to claim 22 wherein calculating the roll stability indicator uses the equation:

$$RI = c_1 \frac{E}{E_{2WL}} + c_2 \frac{\dot{E}}{\dot{E}_{critical}}$$

where RI is the roll stability indicator, $c_1$ and $c_2$ are the speed-dependant constants, $E_{2WL}$ is the critical energy signal, $\dot{E}_{critical}$ is the critical energy rate signal, E is the roll energy signal and $\dot{E}$ is the roll energy rate signal.

25. The system according to claim 19 wherein calculating a roll energy signal uses the equation:

$$E = T + \Pi = \frac{1}{2}I_1(\varphi)\dot{\varphi}^2 + \Pi_{susp}(\varphi) + MgZ(\varphi)$$

where E is the roll energy signal, T is the kinetic energy of the vehicle, Π is the potential energy of the vehicle, $I_1$ is the roll moment of inertia, M is the mass of the vehicle, ϕ is the roll angle, $\Pi_{susp}$ is the potential energy of a suspension of the vehicle during the roll motion, g is the gravitational constant and Z is the movement of the vehicle center of gravity in a vertical direction.

26. The system according to claim 19 wherein calculating the roll energy rate signal uses the equation:

$$\dot{E} = \dot{\varphi}Q$$

where $\dot{E}$ is the roll energy rate signal, $\dot{\varphi}$ is the derivative of the roll angle signal and Q is a generalized force on the vehicle.

27. The system according to claim 19 wherein estimating a roll angle signal and estimating a bank angle signal includes using a GPS signal.

28. The system according to claim 19 wherein the vehicle kinematics signals include vehicle kinematic signals from one or more of a roll rate sensor, a yaw rate sensor, a lateral acceleration sensor, a vehicle speed sensor and a vehicle hand-wheel angle sensor.

* * * * *